(12) United States Patent
Iyer et al.

(10) Patent No.: US 7,751,830 B2
(45) Date of Patent: Jul. 6, 2010

(54) TECHNIQUES FOR PROVING LOCATION/PRESENCE-BASED INFORMATION USING MOBILE IP

(75) Inventors: Jayaraman Iyer, Sunnyvale, CA (US); Anand K. Oswal, Sunnyvale, CA (US); Timothy Stammers, Raleigh, NC (US); Kent Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1042 days.

(21) Appl. No.: 11/453,446

(22) Filed: Jun. 14, 2006

(65) Prior Publication Data

US 2007/0291705 A1 Dec. 20, 2007

Related U.S. Application Data

(60) Provisional application No. 60/774,493, filed on Feb. 17, 2006, provisional application No. 60/780,716, filed on Mar. 9, 2006.

(51) Int. Cl.
*H04W 24/00* (2009.01)

(52) U.S. Cl. .................. 455/456.1; 455/456.5; 370/328

(58) Field of Classification Search ........................ None
See application file for complete search history.

(56) References Cited

U.S. PATENT DOCUMENTS

2005/0265276 A1* 12/2005 Takeda et al. ............... 370/328

2006/0217112 A1* 9/2006 Mo .......................... 455/422.1

OTHER PUBLICATIONS

U.S. Appl. No. 11/408,358, Srinath Gundavelli, et al.
C. Perkins, Ed., "RFC 3344 on IP Mobility Support for IPv4", Acquired at: http://rfc.sunsite.dk/rfc/rfc3344.html, 99 pages, Aug. 2002.
"Mobile IP", Acquired at: http://www.cisco.com/univercd/cc/td/doc/product/software/ios120/120newft/120t/120t1/mobileip.htm , 52 pages, Cisco Systems, Oct. 2003.

* cited by examiner

*Primary Examiner*—Erika A Gary
(74) *Attorney, Agent, or Firm*—Trellis IP Law Group, PC

(57) ABSTRACT

Techniques for allowing a home agent to provide location/presence-based services are provided. In one embodiment, a point of attachment of an access network receives a discovery request from a mobile node. A mobile node is associated with a home agent in a home network different from the access network. Location/presence-based information is determined at the point of attachment. The location/presence-based information is added to a registration request at the layer 3 protocol layer. The registration request is then sent from the point of attachment to the home agent. When the registration request is received at the home agent, the home agent parses the registration request to determine the location/presence information from the request. The home agent then performs a location/presence service using the location/presence information.

34 Claims, 5 Drawing Sheets

ACCESS_TYPE = EVDA|XRTT|EDGE|WiFi
LOCATION_INFO = CELL ID 17
STATE = IDLE

*FIG. 5*

TECHNIQUES FOR PROVING LOCATION/PRESENCE-BASED INFORMATION USING MOBILE IP

CROSS REFERENCES TO RELATED APPLICATIONS

This invention claims priority from U.S. Provisional Patent application Ser. No. 60/774,493 filed on Feb. 17, 2006 and U.S. Provisional Patent application Ser. No. 60/780,176 filed on Mar. 9, 2006, both of which are hereby incorporated by reference in their entirety for all purposes.

BACKGROUND OF THE INVENTION

Embodiments of the present invention generally relate to wireless networks and more specifically to techniques for providing location and presence information using mobile IP signaling.

Mobile IP is a protocol that allows mobile nodes to roam between various subnetworks at various locations while maintaining Internet and/or wide area network (WAN) connectivity. As a mobile node roams between subnetworks, a mobile node attaches to various points of attachment of the subnetworks. The mobile node connects to the point of attachment through the layer 2 protocol layer. In this case, layer 2 information may be exchanged between the foreign network and the mobile node to set up a data link connection between the mobile node and the point of attachment. The layer 2 information is not used by a mobile IP protocol. Rather, mobile IP is directed towards a routing function at the network layer. For example, mobile IP is concerned with routing packets from a mobile node to a correspondent node through a user's home network while the user is roaming. Thus, mobile IP does not deal with sending the layer 2 information to the home network.

A point of attachment may send the layer 2 information to a location server though the layer 2 protocol layer. The location server deals with layer 2 services, such as keeping track of a mobile node's location in an access network. The location may then be used by a base station to contact the mobile node. These services are not robust and are not personalized across mobile nodes because the location server is not in contact with the mobile node's home network.

BRIEF DESCRIPTION OF THE DRAWINGS

FIG. 5 depicts an example of extensions to a registration request according to one embodiment of the present invention.

DETAILED DESCRIPTION OF EMBODIMENTS OF THE INVENTION

Embodiments of the present invention provide techniques for allowing a home agent to provide location/presence-based services. In one embodiment, a point of attachment of an access network receives a discovery request from a mobile node. A mobile node is associated with a home agent in a home network different from the access network. Location/presence-based information is determined at the point of attachment. The location/presence-based information is information needed for location/presence-based services to be performed at the home agent. The location/presence-based information is added to a registration request at the layer 3 protocol layer. The registration request is then sent from the point of attachment to the home agent.

When the registration request is received at the home agent, the home agent parses the registration request to determine the location/presence information from the request. The home agent then determines a location/presence service to provide to the mobile node. That service is then performed using the location/presence information received in the registration request.

Figure 1:
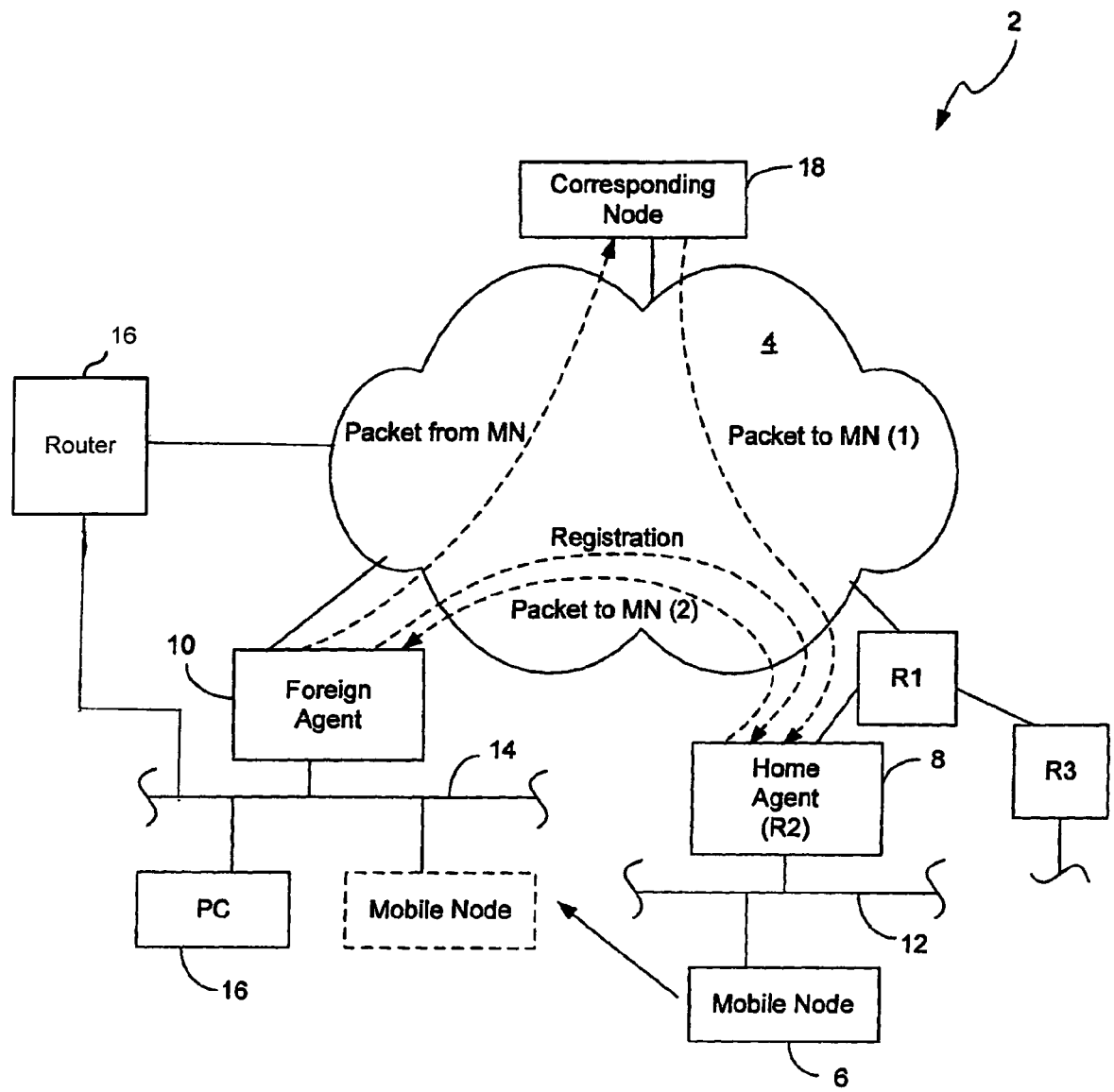
FIG. 1 depicts a simplified system showing a mobile IP process according to one embodiment of the present invention.

FIG. 1 depicts a simplified system 100 showing a mobile IP process according to one embodiment of the present invention. Mobile IP allows mobile node 6 to roam between various subnetworks. Although the mobile IP is described, it will be recognized that other protocols may be appreciated.

Mobile node 6 may be any telecommunications device. For example, mobile node 6 includes a cellular phone, laptop computer, personal digital assistant (PDA), voice-enabled instance message (IM) client, soft phone, etc.

Home agent 8 may be a network device found in the home network of mobile node 6. In one embodiment, home agent 8 may be a router, switch, etc.

Point of attachment 10 may be a network device found in a foreign network. In one example, the point of attachment is a foreign agent. A foreign network is a different subnetwork from the home network associated with mobile node 6. Point of attachment 10 may be router, switch, or any other telecommunication device.

Network 4 may include the Internet or any other wide area network (WAN). In system 2, mobile node 6 can communicate remotely via point of attachment 10 with home agent 8. Point of attachment 10 is implemented using a packet data serving node (PDSN).

Mobile IP allows mobile node 6 to stay connected to its home agent 8 while roaming through various subnetworks. Mobile node 6 includes an IP address that is used to communicate over network 4. The IP address may be location-specific. Each IP address has a field that specifies a particular subnetwork on which the node resides (e.g., its home network). If a user takes a computer that is normally attached to its home network and roams to a different subnetwork (e.g., a foreign network), mobile IP allows the use of the home-based IP address of mobile node 6.

Mobile node 6 plugs into its home network segment 12 and connects to network 4 through home agent 8. When a mobile node roams to a foreign network, such as network segment 14, mobile node 6 communicates via network 4 through an available point of attachment 10. Although one point of attachment 10 is shown, it will be understood that multiple points of attachment 10 may be provided in geographically disparate locations to allow widespread Internet connection via the mobile IP protocol.

Mobile node 6, when it roams to foreign network 14, may identify point of attachment 10 through various solicitations and advertisements. Mobile node 6 and point of attachment 10 may negotiate through the layer 2 protocol layer during an agent discovery process. In this case, mobile node 6 discovers point of attachment 10 on a data link.

Mobile node 6 then needs to register with home agent 8. When mobile node 6 engages with foreign network 14, point of attachment 10 sends a registration request to home agent 8 (as indicated by the dotted line "registration"). After registration, home agent 8 can route packets to mobile node 6 on foreign network 14.

In one embodiment, not every network will have a point of attachment 10. In one embodiment, mobile node 6 may access network 4 through a router 16. Dynamic host configuration protocol (DHCP) may be used to determine an IP address for foreign network 14. The foreign network IP address is used as a co-located address.

In this case, mobile node 6 performs the registration process directly with home agent 8. This is done without a point of attachment 10. In this case, information is sent from home agent 8 to mobile node 6 directly without the use of a point of attachment 10. However, in both cases, location/presence-based information may be determined and sent to home agent 8 using the layer 3 protocol layer. For discussion purposes, the use of point of attachment 10 will be described, but it will be understood that functions performed by point of attachment 10 may be performed by mobile node 6, and vice versa.

Further details of system 2 are described in U.S. patent application Ser. No. 11/408,358, entitled "Attribute Driven Mobile Service Control Logic," filed Apr. 21, 2006, which is hereby incorporated by reference in its entirety for all purposes.

Figure 2:
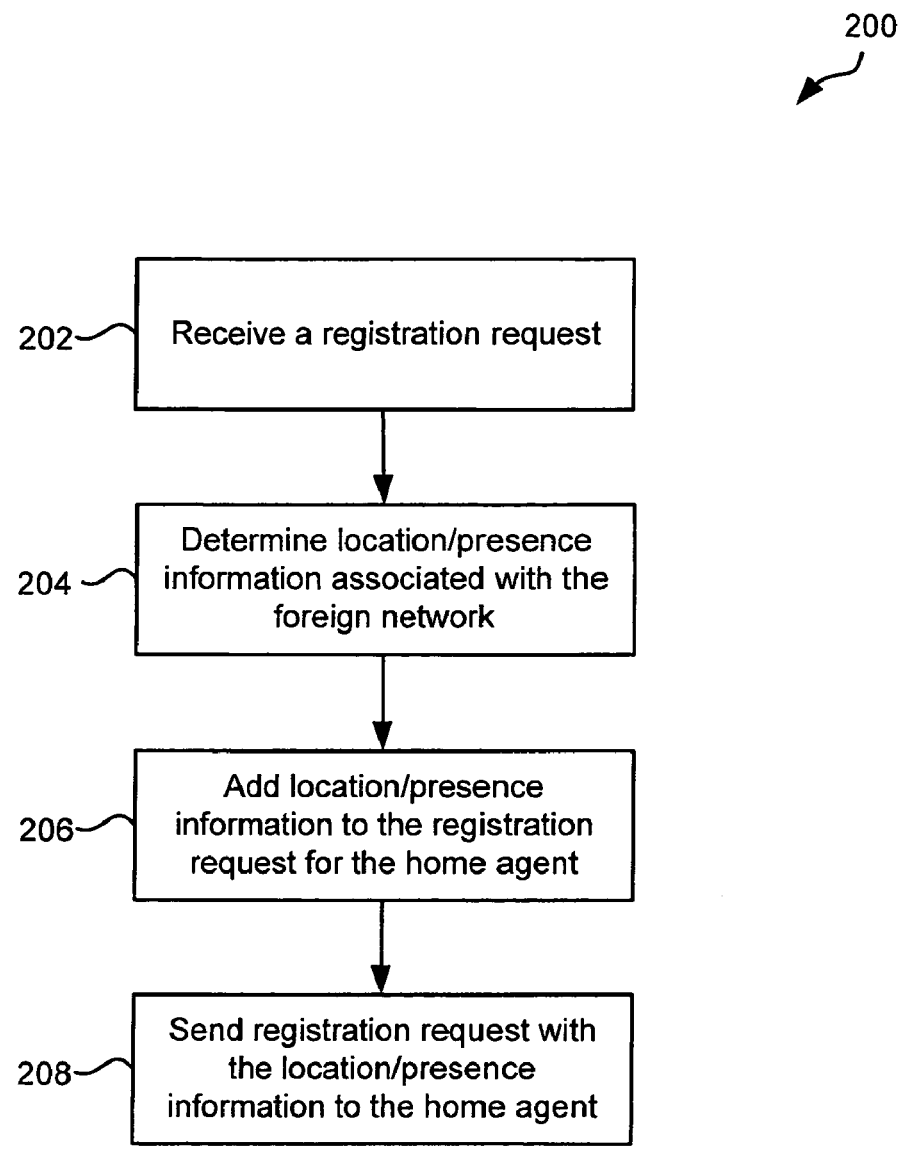
FIG. 2 depicts a simplified flowchart of a method for registering with a home agent according to one embodiment of the present invention.

FIG. 2 depicts a simplified flowchart 200 of a method for registering with home agent 8 according to one embodiment of the present invention. In step 202, point of attachment 10 receives a registration request from mobile node 6.

In step 204, point of attachment 10 determines location/presence-based information that is associated with network 14. This location/presence information may be used for providing location/presence-based services. In one embodiment, the information provided includes a visited network access type, a location of mobile node 6, and a state of mobile node 6. Although the following location/presence information is described, it will be recognized that other location/presence information may be used. The location/presence information, as used, may be any information that is needed by a location/presence service that is available to foreign network 10.

The visited network access type includes the type of network in which mobile node 6 is attached. For example, this may include WiFi, 1XRTT, EVDO, etc. Also, various other types of networks will be appreciated.

The location of mobile node 6 includes location information. This may include several parameters, such as a cell identifier, any regional identifiers that are used in grouping cells, global positioning system (GPS) information, etc. This location information is information accessible to point of attachment 10 and not home agent 8.

The state of mobile node 6 includes an activity reading, such as an idle mode, an active mode, a dormant mode, etc. For example, users may not be using mobile node 6 at the time and thus may be in an idle mode or dormant mode. Also, users may be talking on a cellular phone and thus may be in the active mode.

Point of attachment 10 includes logic that may intelligently determine which location/presence-based information is needed. Embodiments may use extensions defined in Mobile IP to send the location/presence information. Although the extensions are defined, the information that is needed is not defined. Point of attachment 10 determines which location/presence-based information should be sent to home agent 8 as an extension. This information is then included as an extension in the registration request.

In one embodiment, mobile node 6 may send location/presence information to point of attachment 10 for forwarding to home agent 8. For example, mobile node 6 may include a GPS module that sends GPS information to point of attachment 10. Point of attachment 10 can then include the GPS information in the registration request.

In step 206, point of attachment 10 adds the location/presence-based information to a registration request for home agent 8.

In one embodiment, the location/presence-based information is added to a registration request as extensions. FIG. 5 depicts an example of extensions to a registration request according to one embodiment of the present invention. As shown, the extensions include an ACCESS_TYPE=EVDO|1XRTT|EDGE|Wi-Fi, LOCATION_INFO=cell ID of 17, and STATE=IDLE.

Referring back to FIG. 2, in step 208, point of attachment 10 sends the registration request with the location/presence-based information to home agent 8. This is sent at the layer 3 protocol layer. This is different from sending location/presence information using layer 2 information. This registration request is provided through the network layer to home agent 8. This is different from the discovery process at the layer 2 protocol that is typically performed with mobile node 6 and point of attachment 10 discover each other on a data link. In contrast, using layer 3, the registration request is routed to home agent 8.

Figure 3:
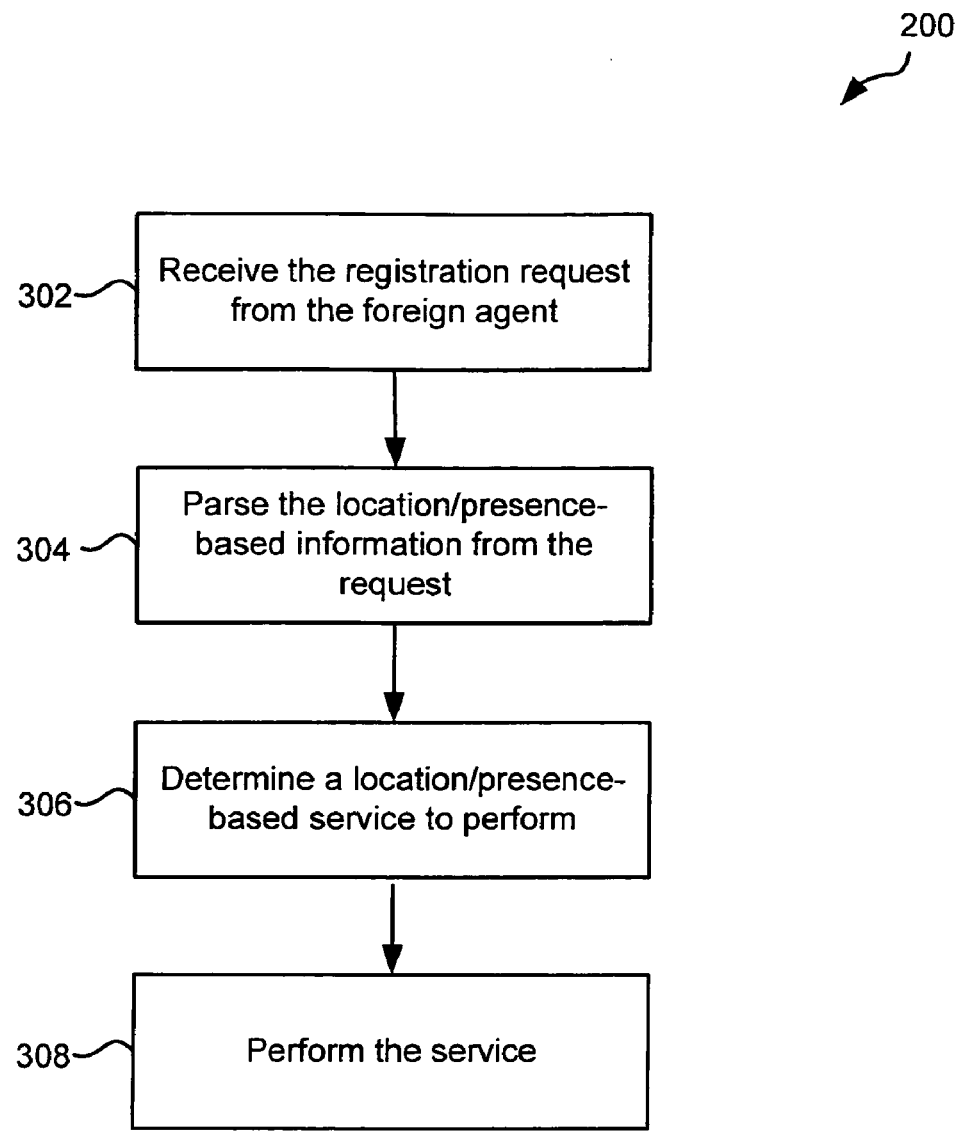
FIG. 3 depicts a simplified flowchart of a method for providing the location/presence-based services according to one embodiment of the present invention.

Once the registration request is received, home agent 8 can provide location/presence-based services. FIG. 3 depicts a simplified flowchart 300 of a method for providing the location/presence-based services according to one embodiment of the present invention. In step 302, home agent 8 receives the registration request from point of attachment 10.

In step 304, home agent 8 parses the location/presence-based information from the request. In one embodiment, the extensions in the request are parsed to determine the location/presence-based information.

In one embodiment, home agent 8 includes logic that intelligently determines which extensions include the location/presence-based information. For example, home agent 8 may use keyword searching to determine certain attributes found in the extensions of the registration requests. It associates information for those attributes as the location/presence-based information.

In step 306, home agent 8 determines a location/presence-based service to perform. In one embodiment, home agent 8 may use user preferences to determine which location/presence-based service to perform. For example, users may desire certain services or subscribe to certain services. This may be done using a user profile or any other mechanism that is used to store user preferences. In another embodiment, a service provider associated with home agent 8 may use the location/presence-based information to determine a service to perform. For example, some service providers may want to provide targeted advertising to the user based on the location of the user. Further, the location/presence-based information may be used for billing, tracking how a network is being used, such as a roaming pattern, providing location information to others, etc.

In step 308, home agent 8 performs the service. Although it is described that home agent 8 performs the service, it will be understood that in performing the service, home agent 8 may communicate with other network devices to perform the location/presence-based service. For example, a map server may be used to determine a map for a user's location.

Figure 4:
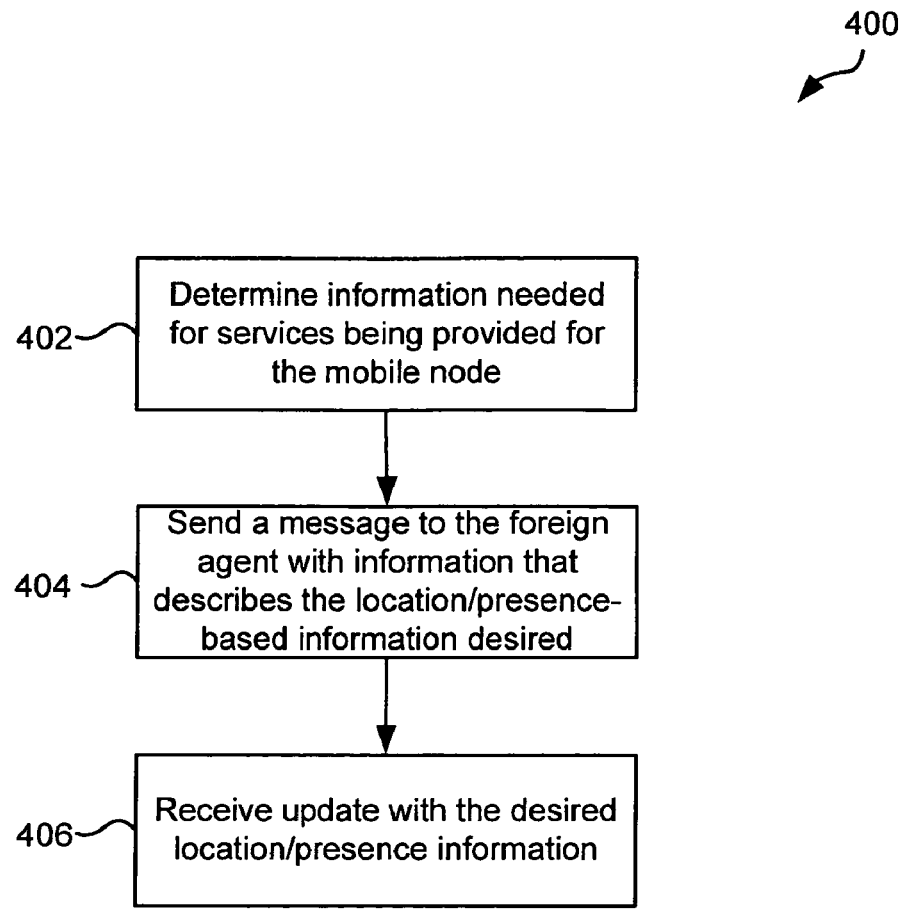
FIG. 4 depicts a simplified flowchart of a method for notifying a point of attachment which information is desired according to one embodiment of the present invention.

When home agent 8 receives the location/presence-based information, home agent 8 may decide that it does not need all of the location/presence-based information for this mobile node 6. For example, for the services provided for mobile node 6, only a subset of the information sent may be needed. FIG. 4 depicts a simplified flowchart 400 of a method for notifying point of attachment 10 which information is desired according to one embodiment of the present invention.

In step 402, home agent 8 determines information needed for services being provided for mobile node 6. For example, only certain services may be offered to a user and thus only information for those services is needed.

In step 404, home agent 8 sends a message to point of attachment 10 with information that describes which location/presence-based information is needed. This message may indicate that home agent 8 does not need a certain type of information.

In step 406, when an update is received from point of attachment 10, the update includes only the information that is desired by home agent 8. Accordingly, embodiments of the present invention may periodically update the location/presence-based information for mobile node 6. Also, the update may be provided when location/presence-based information changes. Further, the update may be sent based on specific trigger conditions. For example, home agent 8 may request updates only when a visited area changes, when movement to a specific cell ID occurs, etc. This information is noted by point of attachment 10 and updated via mobile IP notification messages to home agent 8. Accordingly, the location/presence information may be sent in messages other than registration requests.

Accordingly, by providing preferences on which information is desired, bandwidth used may be reduced. The size of the message that is sent may be reduced or the number of messages sent for each mobile node 6 may be reduced. This may be useful when point of attachment 10 is handling a large number of mobile nodes 6.

Home agent 8 may provide many location/presence-based services using the location/presence-based information received through the layer 3 protocol layer. Because the information is sent to home agent 8 through the network layer, a service provider associated with home agent 8 may provide a user with specific services based on their location/presence. In one example, a service provider may detect a location of the user and then send the user messages based on that location. For example, if a user is near a particular department store, the service provider may send a message to the user indicating that a 10%-off sale at the department store is being provided to the user.

Additionally, other services may be performed by the service provider. For example, the service provider may use the location/presence-based information for their own accounting. For example, roaming patterns may be used to determine where the user typically travels. Targeted advertising may then be sent to the user.

Also, signal quality may be used to provide services, such as sending audio/video to the user. If the signal quality is low, then audio/video may not be sent. Rather, a text message may be sent.

Accordingly, when location/presence-based information is received through the layer 3 protocol layer, home agent 8 can provide personalized services to mobile node 6. User-specific information may be used to provide targeted services from the home network 12. Home agent 8 includes information about the user in which point of attachment 10 does not have access. Thus, services can be customized and more useful to a user if location/presence services are performed by home agent 8.

Although the invention has been described with respect to specific embodiments thereof, these embodiments are merely illustrative, and not restrictive of the invention. Although Mobile IP is described, it will be understood that other protocols that allow a mobile node to roam throughout subnetworks will be appreciated when the term Mobile IP is used.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for processing location/presence-based information for a mobile node, the method comprising:
   receiving, at a home agent of a home network, a message for a mobile node through a layer 3 protocol layer, the message including location/presence-based information determined by a point of attachment in a foreign network in which the mobile node is attached, the foreign network being different from the home network;
   determining the location/presence-based information from the message; and
   processing the location/presence-based information to cause a location/presence service for the mobile node to be performed.

2. The method of claim 1, wherein the location/presence-based information comprises presence and/or location information associated with the mobile node.

3. The method of claim 1, wherein the location/presence-based information comprises a network type of the access network, state of the mobile node, location specific information, or signal strength information.

4. The method of claim 1, further comprising:
   sending, from the home agent, a response indicating which location/presence-based information is desired; and
   receiving the desired location/presence-based information.

5. The method of claim 1, wherein the point of attachment adds the location/presence-based information into the message.

6. The method of claim 1, wherein the message is associated with a mobile IP protocol.

7. The method of claim 1, wherein the message comprises the location/presence-based information added as extensions to signaling messages sent at the layer 3 protocol layer.

8. The method of claim 1, wherein the message comprises a registration request or update message.

9. A method for providing location/presence-based information for a mobile node, the method comprising:
   determining location/presence-based information, wherein the location/presence-based information is based on information associated with a foreign network different from a home network for the mobile node;
   adding, by a point of attachment in the foreign network, the location/presence-based information to a message; and
   sending the message with the location/presence-based information to a home agent through a layer 3 protocol layer, the location/presence-based information allowing a location/presence-based service to be performed by the home agent in the home network.

10. The method of claim 9, wherein the location/presence-based information comprises presence and/or location information associated with the mobile node.

11. The method of claim 9, wherein the location/presence-based information comprises a network type of the access network, state of the mobile node, location specific information, or signal strength information.

12. The method of claim 9, wherein adding the location/presence-based information to the message comprises adding the location/presence-based information as extensions to signaling messages sent at the layer 3 protocol layer.

13. The method of claim 9, further comprising:
receiving a response from the home agent indicating which location/presence-based information is desired by the home agent; and
sending the desired location/presence-based information to the home agent.

14. The method of claim 9, wherein a point of attachment performs the determining, adding, and sending steps.

15. The method of claim 9, wherein the message is associated with a mobile IP protocol.

16. The method of claim 9, wherein the message comprises a registration request or update message.

17. A home agent configured to process location/presence-based information for a mobile node, the apparatus comprising:
one or more computer processors; and
a memory containing instructions that, when executed by the one or more computer processors, cause the one or more computer processors to perform a set of steps comprising:
receiving, at the home agent of a home network, a message for a mobile node through a layer 3 protocol layer, the message including location/presence-based information determined by a point of attachment in a foreign network in which the mobile node is attached, the foreign network being different from the home network;
determining the location/presence-based information from the message; and
processing the location/presence-based information to cause a location/presence service for the mobile node to be performed.

18. The apparatus of claim 17, wherein the location/presence-based information comprises presence and/or location information associated with the mobile node.

19. The apparatus of claim 17, wherein the location/presence-based information comprises a network type of the access network, state of the mobile node, location specific information, or signal strength information.

20. The apparatus of claim 17, wherein the instructions cause the one or more processors to perform further steps comprising:
sending, from the home agent, a response indicating which location/presence-based information is desired; and
receiving the desired location/presence-based information.

21. The method of claim 17, wherein the point of attachment adds the location/presence-based information into the message.

22. The method of claim 17, wherein the message is associated with a mobile IP protocol.

23. The method of claim 17, wherein the message comprises the location/presence-based information added as extensions to signaling messages sent at the layer 3 protocol layer.

24. The method of claim 17, wherein the message comprises a registration request or update message.

25. An apparatus configured to provide location/presence-based information for a mobile, the apparatus comprising:
one or more computer processors; and
a memory containing instructions that, when executed by the one or more computer processors, cause the one or more computer processors to perform a set of steps comprising:
determining location/presence-based information, wherein the location/presence-based information is based on information associated with a foreign network different from a home network for the mobile node;
adding, by an apparatus in the foreign network, the location/presence-based information to a message; and
sending the message with the location/presence-based information to a home agent through a layer 3 protocol layer, the location/presence-based information allowing a location/presence-based service to be performed by the home agent in the home network.

26. The apparatus of claim 25, wherein the location/presence-based information comprises presence and/or location information associated with the mobile node.

27. The apparatus of claim 25, wherein the location/presence-based information comprises a network type of the access network, state of the mobile node, location specific information, or signal strength information.

28. The apparatus of claim 25, wherein the instructions cause the one or more processors to add the location/presence-based information as extensions to signaling messages sent at the layer 3 protocol layer.

29. The apparatus of claim 25, wherein the instructions cause the one or more processors to perform further steps comprising:
receiving a response from the home agent indicating which location/presence-based information is desired by the home agent; and
sending the desired location/presence-based information to the home agent.

30. The apparatus of claim 25, wherein the apparatus comprises a point of attachment.

31. The apparatus of claim 25, wherein the message is associated with a mobile IP protocol.

32. The apparatus of claim 25, wherein the message comprises a registration request or update message.

33. An apparatus configured to process location/presence-based information for a mobile node, the apparatus comprising:
means for receiving, at the apparatus of a home network, a message for a mobile node through a layer 3 protocol layer, the message including location/presence-based information determined by a point of attachment in a foreign network in which the mobile node is attached, the foreign network being different from the home network;
means for determining the location/presence-based information from the message; and
means for processing the location/presence-based information to cause a location/presence service for the mobile node to be performed.

34. An apparatus configured to provide location/presence-based information for a mobile node, the apparatus comprising:
means for determining location/presence-based information, wherein the location/presence-based information is based on information associated with a foreign network different from a home network for the mobile node;
adding, by the apparatus in the foreign network, the location/presence-based information to a message; and
sending the message with the location/presence-based information to a home agent through a layer 3 protocol layer, the location/presence-based information allowing a location/presence-based service to be performed by the home agent in the home network.

* * * * *

UNITED STATES PATENT AND TRADEMARK OFFICE
CERTIFICATE OF CORRECTION

PATENT NO.       : 7,751,830 B2                                              Page 1 of 1
APPLICATION NO.  : 11/453446
DATED            : July 6, 2010
INVENTOR(S)      : Jayaraman Iyer et al.

It is certified that error appears in the above-identified patent and that said Letters Patent is hereby corrected as shown below:

Title page, item [60] under "Related U.S. Application Data", delete "60/780,716" and insert -- 60/780,176 -- and delete "Mar. 9, 2006" and insert -- Mar. 6, 2006 --.

Signed and Sealed this

Seventeenth Day of August, 2010

David J. Kappos
*Director of the United States Patent and Trademark Office*